(12) United States Patent
Addiego et al.

(10) Patent No.: US 7,304,013 B2
(45) Date of Patent: Dec. 4, 2007

(54) METAL OXIDE CATALYSTS

(75) Inventors: William P. Addiego, Big Flats, NY (US); Charles M. Sorensen, Jr., Corning, NY (US)

(73) Assignee: Corning Incorporated, Corning, NY (US)

( * ) Notice: Subject to any disclaimer, the term of this patent is extended or adjusted under 35 U.S.C. 154(b) by 551 days.

(21) Appl. No.: 10/611,508

(22) Filed: Jun. 30, 2003

(65) Prior Publication Data

US 2004/0266613 A1 Dec. 30, 2004

(51) Int. Cl.
*B01J 23/00* (2006.01)
*B01J 21/00* (2006.01)
*B01J 20/00* (2006.01)

(52) U.S. Cl. .............. 502/300; 502/240; 502/242; 502/243; 502/244; 502/245; 502/247; 502/248; 502/253; 502/254; 502/258; 502/263; 502/158; 502/302; 502/305; 502/325; 502/343; 502/345; 502/346; 502/347; 502/348; 502/349; 502/350; 502/351; 502/353; 502/354; 502/415; 502/439; 502/527.19; 502/527.24

(58) Field of Classification Search ......... 502/300, 502/240–243, 246–247, 249, 253–256, 258–263, 502/302–305, 309, 320, 322, 327, 332–339, 502/346, 348, 351, 354, 415, 439, 527.24, 502/158, 527.19, 325, 345, 245, 248
See application file for complete search history.

(56) References Cited

U.S. PATENT DOCUMENTS

| | | | |
|---|---|---|---|
| 4,407,733 A | * | 10/1983 | Birkenstock et al. ....... 502/174 |
| 4,514,517 A | | 4/1985 | Ho et al. |
| 4,579,839 A | | 4/1986 | Pearson |
| 4,622,128 A | | 11/1986 | Young et al. |
| 4,631,269 A | | 12/1986 | Lachman et al. |
| 4,637,995 A | | 1/1987 | DeAngelis et al. |
| 4,748,142 A | | 5/1988 | Chianelli et al. |
| 4,977,129 A | * | 12/1990 | Ernest ..................... 502/330 |
| 5,168,085 A | * | 12/1992 | Addiego et al. ............ 502/66 |
| 5,411,761 A | * | 5/1995 | Inokuchi et al. ........... 427/220 |
| 5,780,384 A | * | 7/1998 | Tomczak et al. ........... 502/324 |
| 5,789,082 A | * | 8/1998 | Treadway ................. 428/412 |
| 6,107,238 A | * | 8/2000 | Contractor et al. ......... 502/247 |
| 6,109,095 A | | 8/2000 | Addiego |
| 6,676,740 B2 | * | 1/2004 | Matsumura et al. ..... 106/287.1 |
| 6,695,904 B2 | * | 2/2004 | Burger et al. .......... 106/287.14 |
| 6,787,236 B2 | * | 9/2004 | Kimura et al. ............. 428/412 |
| 6,793,728 B1 | * | 9/2004 | Davies et al. ............... 106/600 |
| 6,794,046 B1 | * | 9/2004 | Kurze et al. ................ 428/469 |
| 6,878,769 B2 | * | 4/2005 | Sakamoto et al. .......... 524/588 |

OTHER PUBLICATIONS

Wu et al., "A Study for Electrode Coating Material Base on Transition Metal Oxide of Carbon Monoxide Potentiometric Sensor", Chemical Sensors, vol. 17, Supplement B (2001), p. 142-144.

* cited by examiner

*Primary Examiner*—Cam N. Nguyen
(74) *Attorney, Agent, or Firm*—Randall S. Wayland; Anca C. Gheorghiu

(57) ABSTRACT

Bulk and supported catalysts are prepared from an aqueous slurry containing a catalytically active material and a binder. The slurry is either coated onto a support and dried to form a porous, high surface area phase containing the catalytically active material, or reduced to a paste-like consistency, molded and dried to form a bulk catalyst. The processes and catalysts may be employed in various catalytic chemical processes to achieve high effectiveness factor of the catalytically active material while achieving a lower pressure drop.

19 Claims, No Drawings

METAL OXIDE CATALYSTS

BACKGROUND OF THE INVENTION

This invention relates to supported and bulk heterogeneous catalysts that are useful for catalyzing certain types of chemical reactions, the preparation of heterogeneous catalysts, and chemical reaction processes using heterogeneous catalysts.

Heterogeneous catalyst systems are employed in various commercially important chemical processes in the petroleum, petrochemical and chemical industries. In these processes, fluid reactants (liquid or gaseous) are contacted with a solid material exhibiting catalytic activity, with a catalyzed chemical reaction occurring at the interface between the fluid and solid phases. Heterogeneous catalyst systems typically comprise a carrier or support onto which a catalyst is deposited. The catalyst is typically in the form of a metal or metal-containing component that is deposited on the support surface using an impregnation or coating technique. Heterogeneous catalyst systems without a carrier or support are generally referred to as bulk catalysts. Bulk catalysts are typically prepared by co-precipitation techniques in which a catalytically active material and an inert material are substantially uniformly distributed throughout a composite solid material.

Generally the support material has a relatively low surface area making it unsatisfactory for achieving commercially acceptable overall production rates. However, to overcome this problem, a ceramic support is typically prepared by sintering a clay or other material at a high temperature to impart a desirable density and strength, and then the resulting ceramic support is coated with another material having a higher surface area. The catalytically active material is then deposited onto the higher surface area coating. A disadvantage with these heterogeneous catalyst systems having a higher surface area support phase (commonly referred to as a "washcoat") disposed on a sintered lower surface area structural support is that the surface area of the coating tends to decrease during its service life due to erosion and/or thermal cycling in the reactor. Further, preparation of these supported catalysts requires two separate application steps, including first washcoating the carrier, then depositing the catalytically active material on the washcoat.

A problem with unsupported or carrierless heterogeneous catalyst systems that are coextruded with sinterable ceramic material and high surface area material is that they tend to be susceptible to thermal degradation at the elevated service temperatures typically employed during heterogeneous catalytic reaction processes. Moreover, catalyst effectiveness is reduced as compared with the supported catalysts and pressure drop tends to be undesirably high as compared with the supported catalysts.

Accordingly, it would be desirable to provide a method for coating an inert support material having a relatively low surface area with a composition that includes both a catalytically active material and a material that forms a high surface area phase on which the catalytically active material is dispersed. This would reduce the number of steps needed to prepare a supported heterogeneous catalyst and facilitate the preparation of supported catalysts exhibiting a very high effectiveness factor, but without the high pressure drop typically associated with packed bed reactors.

It would also be desirable to provide improved bulk phase heterogeneous catalysts that are prepared by extruding, injection molding or otherwise forming a mass of flowable material into a desired shape and solidifying the material to form a solid shape having a high surface area, porous structure on which a catalytically active material is distributed, and which exhibit an increased effectiveness factor.

SUMMARY OF THE INVENTION

It has been discovered that a coating or self-supporting structure having its own high surface area pore structure and surface properties and containing a catalytically active material can be prepared from a slurry containing a catalytically active material and a binder, wherein the catalytically active material constitutes a major portion of the total solids in the slurry. More specifically, the invention contemplates a process for preparing a supported catalyst or a bulk catalyst from a slurry or flowable mass of material containing a catalytically active material as a major component, and a binder as a minor component. The supported catalyst is prepared by applying a coating of the slurry onto an inert solid support and drying the coating. The bulk catalyst may be prepared by forming a flowable mass of material into a desired shape and solidifying the formed mass to obtain a porous, high surface area structure on which the catalytically active material is dispersed.

Additional features and advantages of the invention will be set forth in the detailed description which follows and will be apparent to those skilled in the art from the description or recognized by practicing the invention as described in the description which follows together with the claims.

It is to be understood that the foregoing description is exemplary of the invention only and is intended to provide an overview for the understanding of the nature and character of the invention as it is defined by the claims.

DETAILED DESCRIPTION OF THE PREFERRED EMBODIMENTS

In accordance with an embodiment of the invention, a supported catalyst comprising an inert solid support and a porous coating phase on the solid support is provided. The porous coating phase has as a major constituent a catalytically active material, and a binder as a minor component for holding the coating together and adhering the coating to the support.

The solid support may be generally any type of conventional support, such as inert or catalytically active, used for the preparation of supported catalysts. These include ceramic, glass, glass-ceramic, metal, and catalytically active support materials. A ceramic support material may be prepared using generally any of the well-known sinterable materials capable of providing mechanical strength and good thermal properties in monolithic supports. Examples of suitable ceramic materials include cordierite, mullite, clay, talc, zirconia, zirconia-spinel, spinels including transition and rare-earth spinels, alumina, silica, aluminosilicate and alumina-zirconia composites. Mixtures of these materials may also be used to the extent that they are compatible and will not degrade each other.

Monolithic ceramic supports may be prepared using any of various conventional ceramic forming techniques such as extrusion processes, dry pressing, slip casting and fusion casting. The solid supports may be formed into various sizes and shapes, including beads, pellets, monolithic honeycomb structures, reticulated foams etc.

The porous coating is prepared by applying a slurry coating onto the solid support and drying or otherwise cure the coating before drying. The slurry contains a catalytically active material as a major component, and a binder as a minor component. Exemplary catalytically active materials include various transition metal-containing materials, such as those useful in hydroprocessing techniques, including hydrocracking, hydrodenitrogenation, hydrodesulfurization, hydrogenation of aromatic and aliphatic unsaturated hydrocarbons, or other industrially relevant reactions such as methanation, water gas shift, etc. Specific examples include transition metal oxides, such as oxides of scandium, titanium, vanadium, chromium, manganese, iron, cobalt, nickel, copper, yttrium, zirconium, niobium, molybdenum, palladium, silver, tantalum, tungsten, bismuth, antimony, tin, zinc, cerium or lanthanum.

Suitable binders include compounds that are hydrolyzable and condensable and/or hydrolyzed and condensable, such as various metal alkoxides, including silica alkoxides, alumina alkoxides, titania alkoxides, and zirconia alkoxides. Specific examples include tetralkylorthosilanes such as tetraethylorthosilane. The hydrolyzable and condensable and/or hydrolyzed and condensable binders may comprise inorganic and/or organometallic compounds.

The catalytically active material being the major constituent in the dried porous coating of the supported catalyst comprises greater than 50 percent by weight of the total material in the slurry on a water-free (dry) basis. More preferably, the catalytically active material comprises greater than 80 percent and even more preferably greater than 90 percent, by weight of the total materials in the slurry on a water-free (dry) basis.

The binder material may be employed in the slurry in an amount of from about 1 percent to less than 100 percent of the weight of the catalytically active material, and more preferably from about 1 percent to about 20 percent of the weight of the catalytically active material.

In addition to the catalytically active material and the binder, the slurry may also contain textural promoters to provide and maintain adhesive and coadhesive structure and physical properties of the solidified coating. Rheology modifiers, including surfactants and dispersants, may be added to the slurry to control the viscosity of the slurry. Textural promoters, rheology modifiers, and surfactants may be added as needed to achieve the desired properties of the slurry and/or dried coating. Fugitive pore formers may also be added to the slurry to increase the porosity of the solidified coating on the substrate support. An example of a pore former which may be utilized is microcrystalline precipitated boehmite. After the slurry has been applied to the inert solid support (e.g., ceramic support) and dried, the pore former, such as boehmite or carbon, may be dehydrated, vaporized or burned out, leaving a porous, low-density structure. A carbon precursor, such as a polymer thermo-set resin, added as a pore former to the washcoat slurry, could be cured or cross-linked after washcoating, dried and calcined or pyrolyzed. Other polymer pore formers may also be suitable, the molecular weight and extent of solubility thereof being based on required pore structure.

Additives such as textural promoters, rheology modifiers and fugitive pore formers are typically employed in relatively low amounts, and generally constitute less than about 10 percent and more typically less than about 5 percent of the materials in the slurry on a dry basis.

In accordance with certain embodiments of the invention, the catalytically active material is in the form of a hydrogel or sol that may be co-precipitated with a hydrolyzable and condensable or hydrolyzed and condensable binder material. In particular, aqueous soluble salts of transition metals are dissolved in a volume of water sufficient to achieve complete dissolution. When two or more metal salts are used, the salts should have similar solubility and precipitation characteristics if homogeneity of the mixed metal species in the precipitate is desired. A silica-containing or aluminum-containing compound, including organometallic compounds, or other binder compatible with water is added to the solution. The salts are then precipitated with an agent, such as a base, to yield insoluble, hydrated transition metal hydroxides. In some cases, an organometallic binder or other binder may initiate precipitation of the transition metals. If needed, the binder component can be added after precipitation of the transition metal salts. Excess water is then removed, if necessary, to achieve a desired mass-percent of solids in the slurry, typically between 20-60 percent of the total slurry mass. Beads, honeycombs, or other inert solid support structures are then coated with the slurry and dried. If needed, viscosity may be adjusted with dispersants. The coating and drying process may be repeated as necessary to achieve a desired coating thickness. The dried coating may be calcined between coatings if necessary. If the binder is hydrolysable, it could be advantageous to place the dried washcoated article in a humid, warm atmosphere to fully hydrolyze the binder to an hydroxide before subsequent waschcoatings or calcinations.

The resulting dried coating has its own pore structure and surface properties which contribute to most, if not all, of the catalyst performance characteristics (e.g., effectiveness factor). Rather than being dispersed as a physically minor component on a support, the catalytically active species is distributed throughout a porous, high volume coating during formation of the coating. The result is greater exposure of the catalytically active material as compared with deposition of the catalytically active material on a conventional support such as an extruded bead. In fact, the effectiveness factor of the catalytically active material in the coating may approach unity, similar to very small beads or trilobes having a diameter less than about 2 millimeters, but without the higher pressure drop associated with a packed bed of beads. Because the catalytically active material is incorporated into the coating as a major component, it can be coated on support structures of various sizes and shapes without losing the effectiveness factor for the reaction. This allows maximum catalyst exposure to the reactant feed while minimizing pressure drop by controlling the void volume between beads or other support structure. Unlike conventional bulk metal oxide catalysts, the invention uses metallo-organic and/or inorganic binders to both hold the coating together and to the support, and provide a porous high surface area structure.

The techniques of this invention may also be used to form layered catalysts by employing different slurry compositions for different coating layers. This technique may be utilized to take advantage of reaction kinetics that are favored by catalysts in a so-called egg-shell configuration.

In accordance with another embodiment of the invention, bulk solid phase catalysts may be prepared by first preparing a slurry as described above, reducing the water content of the slurry to obtain a very viscous slurry having a loose paste-like consistency, and extruding, casting, or otherwise molding the viscous slurry into a desired shape.

The bulk and supported catalysts of this invention may be used in a variety of catalytic reaction processes, such as hydrocracking, hydrodenitrogenation, hydrodesulfurization, hydrogenation, etc, by contacting the catalysts with one or more reactants at conditions suitable for effecting a catalyzed reaction.

The following examples are illustrative, but not limiting, of the invention.

EXAMPLES

Example 1

10 g of Fe(NO3)3 are dissolved in 100 g of water. The salt is precipitated with an amount of base, such as NH4OH, sufficient to precipitate all of it. Excess water is removed by centrifuge, and the precipitated hydrogel is washed several times in excess isopropyl or methyl alcohol, centrifuged after each washing. The gel is then dried between 20-80° C., not to exceed 250° C. in air. To the gel, hydrolyzed tetraethylortho silicate (TEOS) is added, to yield between 1 and 30 weight percent SiO2 after calcination, and mixed. Beads are placed in a wire basket (vide infra) and dipped into the slurry. The beads can be made of fused silica or other types of silica, including porous or non-porous etched glass, glass-ceramic materials, alumina, titania, zirconia, or other stable metal oxide or ceramics, in general; metal support materials are also viable for coating. The beads are drained of excess slurry and tumble-dried to prevent them from sticking together. Afterwards, these are calcined at temperatures between 200 and 400° C.

Example 2

Similar to Example 1, but the TEOS is added unhydrolyzed. TEOS is hydrolyzed by the base of the slurry to form the binder.

Example 3

Similar to Example 1, but the binder is a colloidal silica sol.

Example 4

Similar to Example 1, but a hydrolyzed transition metal alkoxide serves as both a binder, and carbon source for pore forming.

Example 5

Same as Example 1, but fused silica honeycombs or cordierite or other substrate materials as described for beads for use as a honeycomb is coated with the slurry, dried and calcined.

Example 6

Same as Example 1, but the slurry does not contain TEOS. The solution is prepared and mixed with silica powder, precipitated and sprayed-dried. The spray-dried hydrogel is mixed with the hydrolyzed TEOS binder to yield an equivalent silica no greater than 25 weight percent of the calcined washcoat mass. The slurry with the hydrolyzed binder, and other additives if necessary, is used to washcoat beads or honeycombs.

Beads can be shaped as truncated scalloped structures in addition to conventional beads and pellets. The concavitites serve as faces to anchor the washcoat. These faces can be holes or protrusions that also help anchor the coating to the support bead, improving the mechanical strength of the coating.

In addition to coating, the slurry, itself, can be used to yield a self-supporting bead without extrusion through a die.

Example 7

The slurry is made as described earlier with a hydrolyzed TEOS binder or similar. The mass solids loading of the slurry is increased to a very viscous slurry or loose paste-like consistency, such that it is extruded through a syringe and into a hot, fluid with a density lower than the slurry. The viscosity of the slurry should be low enough so that the surface tension interface between the hot fluid and the slurry cause a drop to become spherical. The heat encourages consolidation of the slurry. The miscibility of the hot fluid should also favorably help pull water from the forming bead during consolidation.

It will become apparent to those skilled in the art that various modifications to the preferred embodiment of the invention as described herein can be made without departing from the spirit or scope of the invention as defined by the appended claims.

The invention claimed is:

1. A supported catalyst, comprising:
   a solid support; and
   a porous coating on the solid support, the porous coating having as a major constituent a material exhibiting catalytic activity, the material exhibiting catalytic activity including a transition-metal containing material, the porous coating having a binder for holding the coating together and adhering the coating to the support.

2. The supported catalyst of claim 1, wherein the transition metal-containing material includes an oxide of a transition metal.

3. The supported catalyst of claim 2, wherein the transition metal is selected from the group consisting of scandium, titanium, vanadium, chromium, manganese, iron, cobalt, nickel, copper, yttrium, zirconium, niobium, molybdenum, palladium, silver, tantalum, tungsten, bismuth, antimony, tin, zinc, cerium and lanthanum.

4. The supported catalyst of claim 3, wherein the transition metal is selected from the group consisting of nickel, cobalt, iron, molybdenum, tungsten and chromium.

5. The supported catalyst of claim 1, wherein the solid support is inert or catalytically active.

6. The supported catalyst of claim 5, wherein the solid support is inert.

7. The supported catalyst of claim 6, wherein the inert solid support is made of a material selected from the group consisting of a metal, glass, ceramic and glass-ceramic material.

8. The supported catalyst of claim 7, wherein the inert solid support is comprised of alumina, titania or silica.

9. The supported catalyst of claim 5, wherein the solid support is in the form of a bead, a pellet, a monolithic honeycomb, or a reticulated foam.

10. The supported catalyst of claim 1, wherein the binder is a condensed silica-containing and/or alumina-containing compound.

11. The supported catalyst of claim 1, wherein the binder includes an alkoxysilane.

12. The supported catalyst of claim 11, wherein the alkoxysilane is tetraethylorthosilane.

13. A bulk transition metal-containing material catalyst, comprising:
    a porous solid mass having as a major constituent a transition metal oxide, the solid mass having a binder for holding the catalytically active material together in the solid mass.

14. The bulk catalyst of claim 13, wherein the transition metal oxide is selected from the group consisting of scandium, titanium, vanadium, chromium, manganese, iron, cobalt, nickel, copper, yttrium, zirconium, niobium, molybdenum, palladium, silver, lanthanum, tantalum, tungsten, bismuth, antimony, tin, zinc, cerium and lanthanum.

15. The bulk catalyst of claim 13, wherein the transition metal oxide is selected from the group consisting of nickel, cobalt, iron, molybdenum, tungsten and chromium.

16. The bulk catalyst of claim 13, which is in the form of beads, pellets, or a monolithic honeycomb.

17. The bulk catalyst of claim 13, wherein the binder is a condensed silicone-containing and/or alumina-containing compound.

18. The bulk catalyst of claim 13, wherein the binder includes an alkoxysilane.

19. The bulk catalyst of claim 18, wherein the alkoxysilane is tetraethylorthosilane.

* * * * *

UNITED STATES PATENT AND TRADEMARK OFFICE
CERTIFICATE OF CORRECTION

| | | |
|---|---|---|
| PATENT NO. | : 7,304,013 B2 | Page 1 of 1 |
| APPLICATION NO. | : 10/611508 | |
| DATED | : December 4, 2007 | |
| INVENTOR(S) | : William Peter Addiego et al. | |

It is certified that error appears in the above-identified patent and that said Letters Patent is hereby corrected as shown below:

*Col.*   *Line*

8   2   "silicone-containing" should be --silicon-containing-- .

Signed and Sealed this

Twenty-seventh Day of May, 2008

JON W. DUDAS
*Director of the United States Patent and Trademark Office*